S. G. SMITH.
PNEUMATIC TIRE ARMOR.
APPLICATION FILED SEPT. 19, 1917.
1,253,740.
Patented Jan. 15, 1918.
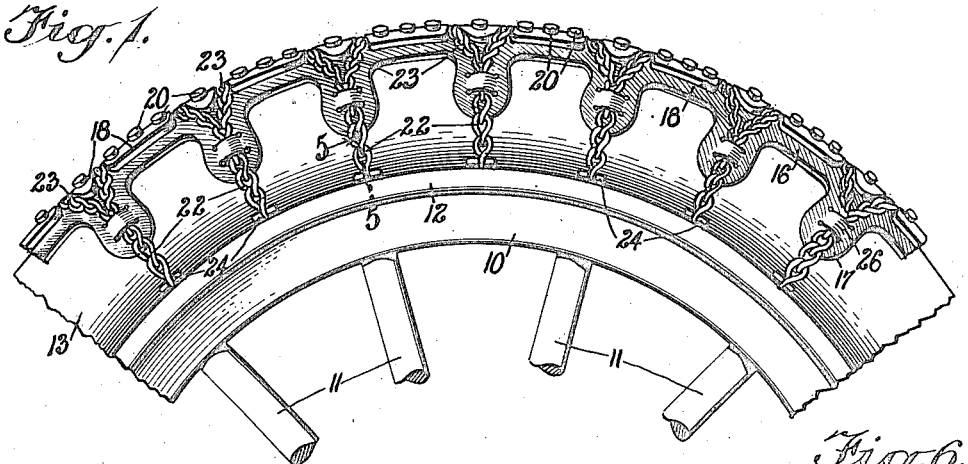
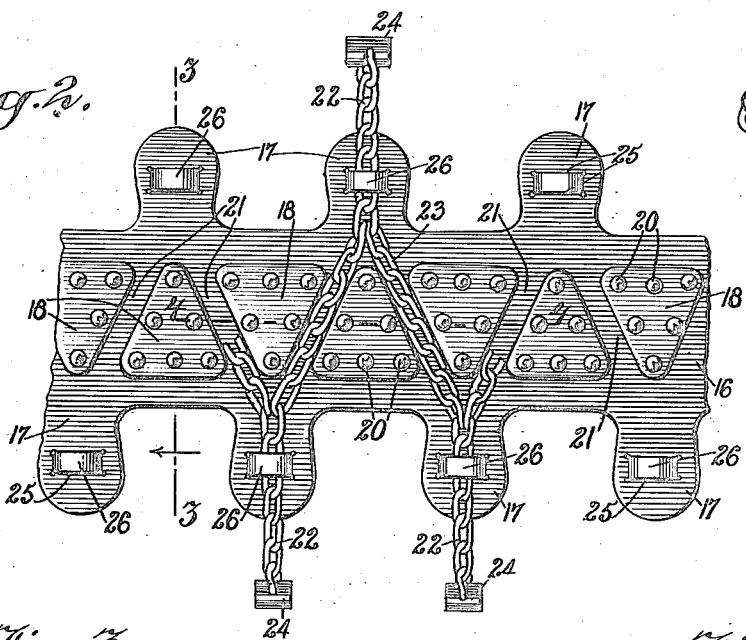
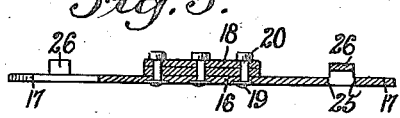
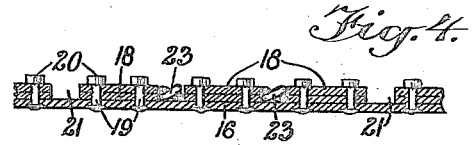
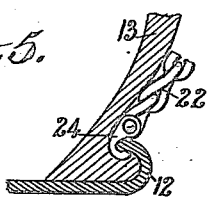
WITNESSES
INVENTOR
S. G. Smith
BY
ATTORNEYS

UNITED STATES PATENT OFFICE.

SAMPSON GRANVILLE SMITH, OF PLAINFIELD, NEW JERSEY.

PNEUMATIC-TIRE ARMOR.

1,253,740.　　　　　Specification of Letters Patent.　　Patented Jan. 15, 1918.

Application filed September 19, 1917. Serial No. 192,084.

*To all whom it may concern:*

Be it known that I, SAMPSON GRANVILLE SMITH, a citizen of the United States, and a resident of Plainfield, in the county of Union and State of New Jersey, have invented a new and Improved Pneumatic-Tire Armor, of which the following is a full, clear, and exact description.

This invention relates to armors or protecting devices for pneumatic tires or the like and has particular reference to armors designed to be easily applied to the tread portions of wheels for emergency purposes or to be worn permanently thereon if so desired.

Among the special objects of the invention is to provide a tire armor, the tread or main portion of which is composed of a main body or strip of material to which are secured a series or plurality of peculiarly shaped reinforcement or wear elements, adjacent elements being spaced somewhat from each other, and flexible metal devices extending transversely of the armor and diagonally between the several wear elements as will be more fully set forth below.

A further object of the invention is to provide a pneumatic tire armor having a substantially imperforate tread portion and on each side being provided with a series of spaced straps or tabs of flexible nature adapted to extend inwardly toward the axis of the wheel along the sides of the tire, flexible stays being provided and extending across the tread and radially of the wheel along said straps or tabs to which they are connected.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a portion of a wheel having my improvement in operative position thereon.

Fig. 2 is a plan view of a portion of the armor laid out flat.

Fig. 3 is a sectional detail on the line 3—3 of Fig. 2.

Fig. 4 is a similar view on the line 4—4.

Fig. 5 is a sectional detail on the line 5—5 of Fig. 1; and

Fig. 6 is a detail view of a modification of means for securing the anchor clip directly to the tab.

Referring now more particularly to the drawings I show a conventional form of wheel comprising a felly 10, spokes 11, rim 12 and pneumatic or similar tire 13. As to the special construction of the wheel or any of its parts as above referred to I am not particularly concerned, except to observe that my improvement is adapted to be employed in connection with any ordinary or conventional wheel construction.

In general my improvement may be described as comprising two main parts or features, namely, a band portion and transverse stay means. The band is composed of a tread portion or body 16 of a width suitable to fairly cover or protect the tread portion of the tire, such width being uniform throughout the full circumference of the armor except as to the strap or tab features 17 arranged in series on opposite sides of the body and extending laterally and inwardly toward the center of the wheel from the edges of the body. The body 16 may be made of any suitable tough, strong, flexible wear resisting material and preferably imperforate, but for rivet holes to be mentioned below. For examples of suitable materials I may mention raw hide, sole or other types of leather, or compositions of fabric or the like and made in an endless belt form. The tabs 17 are preferably formed integral with and constitute extensions of said body 16 or may be secured thereto in any other suitable manner. The tabs obviously are of flexible material and of sufficient strength for the several purposes below enumerated.

The stay means is composed of an assemblage of flexible metal elements such as a substantial type of chain material arranged in a peculiar manner and adapted to extend across the wearing surface of the band portion, and the stay means serving at least two important functions, one of which is to constitute the means for holding the band in place on the tire whereby it is held positively from either radial or lateral movement, and another important function of the tread means is to constitute a direct wear-resisting medium as well as a strengthening or reinforcing means to prevent rupture of the tire due to blow-outs or other expansive forces.

Referring again to the band structure it will be noted that the tread or wear surface of the body 16 is fitted with a circumferential series of projections, plates or the like indicated at 18, preferably all of the same size and character and each in the form of a triangle in plan view. Each plate 18 may be of any suitable material such as leather or any kind of tough, flexible material, or even in some cases of metal, or its equivalent. Furthermore each plate device may be built up of several plies, if desired, but in any event is adapted to be secured in fixed position to the outer or tread surface of the body 16 by means of a plurality of rivets 19 or the like passing through the plates and body and formed with heads or projections 20 on their outer ends. I indicate and preferably employ six of these rivets for each plate and with the heads 20 of relatively large size may constitute direct non-skid or traction features and sustain a large portion of the road wear to which the machine is subjected. As noted in Fig. 2 especially, each two adjacent plates 18 are arranged with their apexes extending in opposite directions transversely of the wheel and with a space 21 observed between them. The plates being of a substantial thickness the depth of the space 21 is accordingly appreciable.

Reverting again to the transverse stay means it may be described specifically as including connected short lengths 22 and 23 of strong chains, and each chain 22 is connected at its outer end directly to two adjacent chains 23. The other end of each chain 22 is permanently connected to a clip or hook 24 of any suitable form or type adapting it for the connection of such chain to the flange of the rim 12. The chains 22 on opposite sides of the device or tire to which the device is connected extend directly around the side portions of the tire in planes intersecting in the axis of the wheel. Each chain 22 furthermore lies against the outer surface of a tab 17 and is preferably permanently connected thereto by any suitable means. With the tabs made of leather or the like I preferably slit the same as indicated at 25, each tab having two parallel slits extending circumferentially of the wheel forming a keeper 26 with its ends integral with the main portion of the tab. The slits are long enough to permit the passage between the keeper 26 and the main portion of the tab of the chain 22. The tabs 17 on one side of the device are preferably staggered or offset with respect to the series of tabs on the other side of the device and hence since each tab carries a chain 22 it follows that the chains 22 on opposite sides are likewise staggered. Each chain 23 is connected at one end to the outermost link of a chain 22 and at its other end to the outermost link of the next adjacent chain 22 on the opposite side of the armor. The plates 18 are so designed and arranged, therefore, that each chain 23 extends across the tread in a diagonal direction and lies within the space 21. Primarily the direct initial contact between the armor and the roadway is borne or received by the heads 20 of the rivets while the chains 23 lie within the spaces 21 and radially of the wheel within the ends or points of the heads 20. In practice, however, while the rivets 19 wear or press inwardly, a considerable portion of the strain or wear upon the armor is borne directly by the chains or stay means.

The stay means acts immediately as a binder for securing the band structure upon the tire, and since the stay means is calculated to resist a maximum amount of tensile strain it follows that a tire thus protected will withstand an unusually great bursting strain. The tabs 17, as well as the tread body 16, serve to prevent any possibility of the chain members cutting or damaging the pneumatic tire in practice. With reference now to the function of the stay means to preventing twisting of the band portion or displacement thereof laterally around the tire it will be noted that each chain 22 is disposed directly in transverse circumferential alinement with the altitude of that plate 18 whose apex is located directly in the crotch formed by the junction of the two diagonal chains 23 connected to said chain 22. From this fact it follows that the portion of the band structure represented by said plate can not creep toward the chain 22 just referred to. This description obviously applies to each chain 22 and the plate directly opposite the same.

An armor such as disclosed herein is of relatively simple construction, but of unusually strong and effective nature for a tread covering and tire protector. It may be secured easily and quickly in place upon the tire when the latter is deflated inasmuch as the clips 24 may at such time be easily forced or slipped between the beads of the tire and the inner surfaces of the rim flanges. When the tire is inflated again the clips are positively held from separation from the flanges, hence the protector is secured reliably in place. In my experience I have proved that an armor made in accordance with this invention will add more than double to the average life of a tire, and as compared with standard pneumatic tires the price may be fixed at very much less.

From the drawings it will be observed that the tread plates 18 are relatively narrow and hence provide a small or narrow tread portion, the direct result of which is to reduce tractive friction between the tire and roadway and yet with the rivets 20 provided with large cylindrical heads as indicated, the non-skid effect of my improved armor is unusually great. Furthermore while I provide the maximum degree of non-slipping or non-skidding action the danger of damage to the city street or pavement is not excessive. I wish to observe also in this connection that inasmuch as the immediate tractive effect is borne by the plates and their rivets in some cases as for example in connection with motorcycles or other light vehicles, it is not necessary to employ the metallic stay means in order to insure sufficient strength or non-skid qualifications. The tread plates 18 being of triangular form and spaced from one another act in themselves because of their form, as means preventing lateral movement or skidding of the vehicle. If the chains are not required in any particular structure for reasons just indicated, the armor may be secured to the rim 12 by means of the anchor members 24 being secured directly to the tabs 17' as suggested in Fig. 6.

My improvement in any of its forms is of relatively light structure, adding little to the weight of the wheel equipment. It is to be noted furthermore that the circumferential spaces provided between the tabs 17 provide clearance for bulging of the tire due to the expansive action of heat on the air therein and also these clearance spaces insure a cooler effect than would be true in cases where the tire is protected by an armor without such spaces or openings.

I claim:

1. A tire armor comprising a circumferential tread body, a circumferential series of strong projections in spaced relation, a tab extending from the edge of the body opposite every projection, and transverse stay means comprising chains lying between adjacent projections and other chains connected with the first chains and lying against the outer surfaces of the tabs.

2. A tire armor comprising an endless circumferential tread body, a circumferential series of plates secured to the outer surface of the body in spaced relation to one another throughout the series, a flexible tab projecting laterally from the body in transverse alinement with each plate, and transverse stay means extending across the body and including three flexible members for each plate and tab, two of such members lying in the spaces on opposite sides of a plate and the third member lying upon the tab and having one end thereof connected to body of said two elements.

3. A tire armor comprising, in combination, a band structure having tabs at its edges and provided with a circumferential series of spaced triangular plates, the apexes of each two adjacent plates being directed laterally in opposite directions, and transverse stay means coöperating with the band structure, said stay means including two chain elements lying in the spaces between the plates and a third chain element having its ends connected to said two chain elements and lying against and secured to the tabs.

4. A tire armor comprising an endless band structure having tabs at its edges, the tabs at one edge being staggered with respect to the tabs at the other edge, and provided with a series of spaced triangular plates, the apex of one plate lying in circumferential alinement with the base of the next adjacent plate and each with its apex opposite a tab, transverse stay means comprising a plurality of connected chain elements, some chain elements extending diagonally across the band in the spaces between adjacent plates, and other chain elements lying in radial planes at the sides of the band member, each side chain element being connected at its outer end to two of the diagonal elements and to the tabs.

5. The herein described tire armor comprising a flexible band structure having a plurality of tabs along each side thereof, each tab being slitted circumferentially of the wheel forming a keeper, and transverse flexible stay means extending across the outer surface of the band member and having portions extending along the outer surfaces of the tabs and through the keepers formed thereon.

6. The herein described tire armor comprising a flexible imperforate band structure having a plurality of tabs along the sides thereof, means coöperating with the band and tabs to lock the band in place over the tread portion of a tire, a series of transversely arranged spaced triangular tread plates, each two adjacent plates being reversely tapered, and a plurality of cylindrical headed rivets securing each plate in place, said rivets serving to take the direct tractive action.

SAMPSON GRANVILLE SMITH.